US012162450B2

(12) United States Patent
Sunke et al.

(10) Patent No.: US 12,162,450 B2
(45) Date of Patent: Dec. 10, 2024

(54) ACTUATOR FOR PARKING BRAKE (71) Applicant: HL MANDO CORPORATION, Pyeongtaek-si (KR)

(72) Inventors: Prakash D Sunke, Haryana (IN); Sudhirkumar S Karajgi, Haryana (IN)

(73) Assignee: HL MANDO CORPORATION, Pyeongtaek si (KR)

( * ) Notice: Subject to any disclaimer, the term of this patent is extended or adjusted under 35 U.S.C. 154(b) by 323 days.

(21) Appl. No.: 17/774,600

(22) PCT Filed: Oct. 12, 2020

(86) PCT No.: PCT/KR2020/013864
§ 371 (c)(1),
(2) Date: May 5, 2022

(87) PCT Pub. No.: WO2021/091102
PCT Pub. Date: May 14, 2021

(65) Prior Publication Data
US 2022/0388489 A1 Dec. 8, 2022

(30) Foreign Application Priority Data
Nov. 6, 2019 (KR) .................. 10-2019-0140815

(51) Int. Cl.
*B60T 13/74* (2006.01)
*F16D 65/16* (2006.01)
(Continued)

(52) U.S. Cl.
CPC ............ *B60T 13/746* (2013.01); *F16D 65/16* (2013.01); *F16D 2121/24* (2013.01);
(Continued)

(58) Field of Classification Search
CPC .... B60T 13/746; F16D 65/16; F16D 2121/24; F16D 2125/50; F16D 2127/06; F16D 2129/08
(Continued)

(56) References Cited

U.S. PATENT DOCUMENTS 6,315,092 B1 * 11/2001 Schwarz ............... B60T 13/741
188/71.9
6,806,602 B2 * 10/2004 Hilzinger ............ B60T 13/741
310/216.106
(Continued)

FOREIGN PATENT DOCUMENTS

| JP | 2016-142411 A | 8/2016 |
|---|---|---|
| KR | 10-2004-0034708 A | 4/2004 |
| KR | 10-2015-0117116 A | 10/2015 |

OTHER PUBLICATIONS

International Search Report (PCT/ISA/210) issued in PCT Application No. PCT/KR2020/013864 dated Feb. 3, 2021 with English Translation.
(Continued)

*Primary Examiner* — Christopher P Schwartz
(74) *Attorney, Agent, or Firm* — LEE, HONG, DEGERMAN, KANG & WAIMEY (57) ABSTRACT

Disclosed is an actuator for a parking brake. In accordance with an aspect of the disclosure an actuator for a parking brake includes a motor generating power; a reduction gear portion configured to transmit the power of the motor to a parking portion implementing a parking braking of a vehicle; a housing in which the motor and the reduction gear portion are accommodated; a housing cover for closing the housing; and a locking portion configured to limit rotation of the reduction gear portion; wherein the locking portion is configured to a locking member that is provided to be movable in an axial direction of the reduction gear portion (Continued)

and is close contact with or spaced apart from the reduction gear portion, an elastic member elastically supporting the locking member toward the reduction gear portion, an electromagnet member configured to separate the locking member from the reduction gear portion by generating an electromagnetic force when the power is applied.

12 Claims, 7 Drawing Sheets

(51) Int. Cl.
*F16D 121/24* (2012.01)
*F16D 125/50* (2012.01)
*F16D 127/06* (2012.01)
*F16D 129/08* (2012.01)

(52) U.S. Cl.
CPC ...... *F16D 2125/50* (2013.01); *F16D 2127/06* (2013.01); *F16D 2129/08* (2013.01)

(58) Field of Classification Search
USPC .......................................... 188/72.3, 156–164
See application file for complete search history.

(56) References Cited

U.S. PATENT DOCUMENTS

| | | | |
|---|---|---|---|
| 8,678,147 B2* | 3/2014 | Usui | F16D 65/18 |
| | | | 188/72.3 |
| 9,199,623 B2* | 12/2015 | Hyun | B60T 8/885 |
| 9,341,222 B2* | 5/2016 | Masuda | B60T 13/741 |
| 9,421,959 B2* | 8/2016 | Muramatsu | F16D 66/00 |
| 10,047,812 B2* | 8/2018 | Watzek | F16D 65/18 |
| 2005/0274580 A1 | 12/2005 | Hageman et al. | |
| 2018/0017115 A1* | 1/2018 | Saoyama | H02K 7/116 |
| 2019/0152460 A1 | 5/2019 | Antanaitis et al. | |
| 2022/0396252 A1* | 12/2022 | Karajgi | B60T 13/741 |
| 2022/0396253 A1* | 12/2022 | Karajgi | B60T 13/741 |

OTHER PUBLICATIONS

Written Opinion (PCT/ISA/237) issued in PCT Application No. PCT/KR2020/013864 dated Feb. 3, 2021.

* cited by examiner

ACTUATOR FOR PARKING BRAKE

CROSS-REFERENCE OF RELATED APPLICATIONS

This application is the U.S. National Phase under 35 U.S.C. § 371 of International Patent Application No. PCT/KR2020/013864, filed on Oct. 12, 2020, which claims the benefit of Korean Patent Application No. 10-2019-0140815, filed on Nov. 6, 2019, the entire disclosures of each are incorporated by reference herein.

ACTUATOR FOR PARKING BRAKE

Technical Field

The disclosure relates to an actuator for a parking brake, and more particularly, to an actuator for a parking brake capable of stably maintaining a parking braking state when the parking brake is operated.

Background Art

Generally, a vehicle is equipped with a brake system for performing braking essentially. Such a brake system requires a service brake function that provides braking force in a driving situation of the vehicle, and a parking brake function that maintains the vehicle in a stopped state when parking.

In a conventional parking brake, a foot brake driven by pedaling with a foot and a hand brake by pulling a lever by a hand are mainly used. For the hand brake, a user pulls the lever up with one hand with a lot of force to operate a lever of the parking brake, so that drivers who stop and park frequently a vehicle may injure their backs and put strain on their arms. Furthermore, a lever of a parking brake is located in a center of a console, which limits utilization of an indoor space of a vehicle.

Therefore, nowadays, a method of implementing electro-mechanical parking braking by using an actuator that generates braking force by a motor by receiving the driver's intention for parking braking as an electrical signal, such as pressing a button is being developed.

During a parking brake of a vehicle, a parking portion, such as a piston and a nut-spindle of a caliper brake and a parking brake shoe of a drum brake, maintains braking force. However, even if the parking portion maintains parking braking power, if there is a variable that prevents maintenance of parking braking, such as receiving an external shock or having to park a vehicle on a slope, the parking braking state of the vehicle may be released and then the vehicle may move. Accordingly, to prevent the vehicle from moving in spite of the parking braking state, stones or struts are often placed between wheels or at a rear of the wheels.

To maintain the parking braking state when a parking brake function of the vehicle is operated as described above, various locking methods have been developed such as a separate locking gear that is provided in a gear portion of the actuator so as to maintain the fixed state of the actuator.

Disclosure

Technical Problem

An aspect of the disclosure is to provide an actuator for a parking brake capable of suppressing a roll back of a vehicle during a parking braking.

Another aspect of the disclosure is to provide an actuator for a parking brake capable of improving responsiveness and stability during the parking braking.

Another aspect of the disclosure is to provide an actuator for a parking brake capable of improving ease of assembly of a product and improving a design freedom of the vehicle.

Another aspect of the disclosure is to provide an actuator for a parking brake that maintains a locked state when power is not applied to reduce vehicle current consumption and has a fail-safe function.

Technical Solution

In accordance with an aspect of the present disclosure, an actuator for a parking brake includes a motor generating power; a reduction gear portion configured to transmit the power of the motor to a parking portion implementing a parking braking of a vehicle; a housing in which the motor and the reduction gear portion are accommodated; a housing cover for closing the housing; and a locking portion configured to limit rotation of the reduction gear portion; wherein the locking portion is configured to a locking member that is provided to be movable in an axial direction of the reduction gear portion and is close contact with or spaced apart from the reduction gear portion, an elastic member elastically supporting the locking member toward the reduction gear portion, an electromagnet member configured to separate the locking member from the reduction gear portion by generating an electromagnetic force when the power is applied.

The locking member may include a plate, and a first friction member that is provided on a surface of the plate facing the reduction gear portion and provided to bring into close contact with the reduction gear portion.

The locking member may include at least one pin having one side thereof coupled to the plate and the other side thereof inserted into the housing cover to prevent rotation of the plate.

The elastic member may be provided as at least one coil spring interposed between the housing cover and the plate.

The at least one pin may be disposed radially with respect to a central axis of the plate.

The housing may include at least one boss protruding at a position corresponding to the at least one pin and having a hole recessed therein for accommodating the at least one pin.

The electromagnet member may include a core having one side thereof coupled to the housing cover and the other side thereof protruding toward the locking member, and a coil wound on an outer circumferential surface of the core to generate electromagnetic force.

The reduction gear portion may further include a second friction member provided on a surface facing the first friction member.

The plate, the first friction member, the second friction member, and the reduction gear portion may be provided side by side.

A surface facing the first friction member may be friction coated in the reduction gear portion.

The plate may be disposed coaxially with the reduction gear portion and provided in a circular shape.

The at least one pin may be coupled to at least one extension portion extending radially from an edge of the plate.

The reduction gear portion may include a driving gear interlocked with a drive shaft of the motor, a sun gear coupled to the driving gear to rotate together, a plurality of planetary gears meshed with the sun gear, and an external gear meshed with the plurality of planetary gears and having a connection portion connected to the parking portion.

In accordance with another aspect of the present disclosure, an actuator for a parking brake include a motor generating power; a reduction gear portion including a driving gear receiving the power from a driving shaft of the motor and transmitting the power to a parking portion implementing a parking braking of a vehicle; and a locking portion that is provided to be movable up and down from an upper side of the driving gear, and is provided to bring into close contact with the driving gear to limit rotation of the driving gear.

The locking portion may include a locking member provided to be in close contact with the driving gear to limit rotation of the driving gear by using a friction force; an elastic member elastically supporting the locking member toward the reduction gear portion; and an electromagnet member configured to separate the locking member from the reduction gear portion by generating an electromagnetic force when power is applied.

Advantageous Effects

An embodiment of disclosure may provide an actuator for a parking brake capable of suppressing a roll back of a vehicle during a parking braking.

Further, an embodiment of disclosure may provide an actuator for a parking brake capable of improving responsiveness and stability during the parking braking.

Further, an embodiment of disclosure may provide an actuator for a parking brake capable of improving each of assembly of a product and improving a design freedom of the vehicle.

Further, an embodiment of disclosure may provide an actuator for a parking brake that maintains a locked state when power is not applied to reduce vehicle current consumption and has a fail-safe function.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
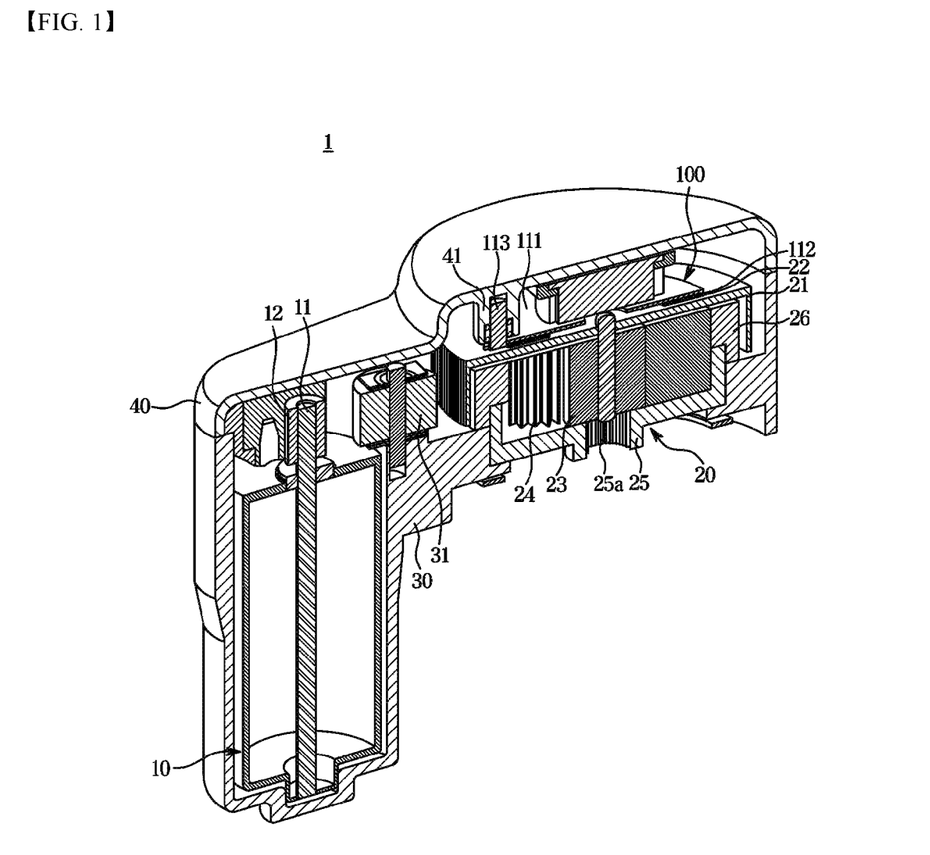
FIG. 1 is a cutaway perspective view schematically illustrating a cross section of an actuator for a parking brake according to an embodiment of the disclosure.
Figure 2:
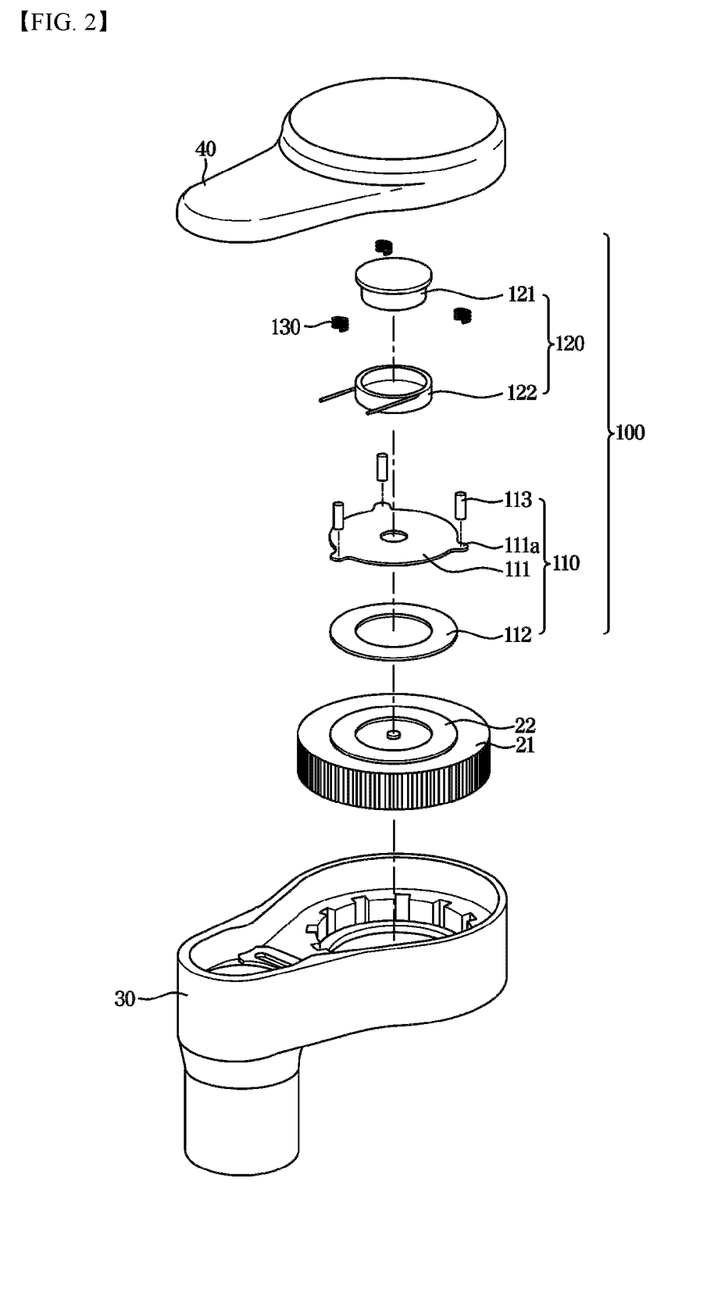
FIG. 2 is an exploded perspective view illustrating an actuator for a parking brake according to an embodiment of the disclosure.
Figure 3:
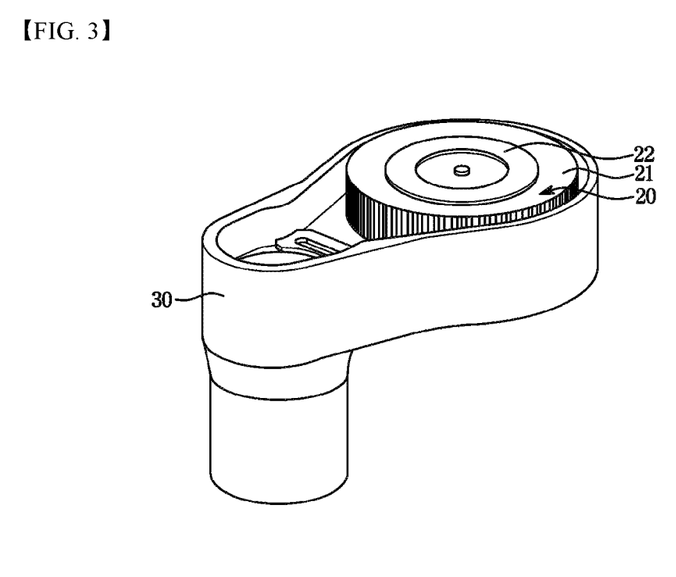
FIG. 3 is a perspective view illustrating a state in which a reduction gear portion of an actuator for a parking brake is assembled to a housing according to an embodiment of the disclosure.
Figure 4:
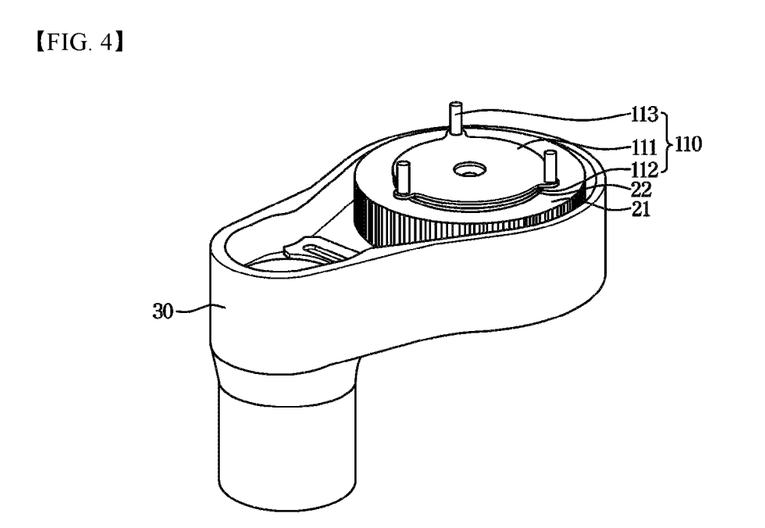
FIG. 4 is a perspective view illustrating a state in which a reduction gear portion and a locking member of an actuator for a parking brake are assembled to a housing according to an embodiment of the disclosure.
Figure 5:
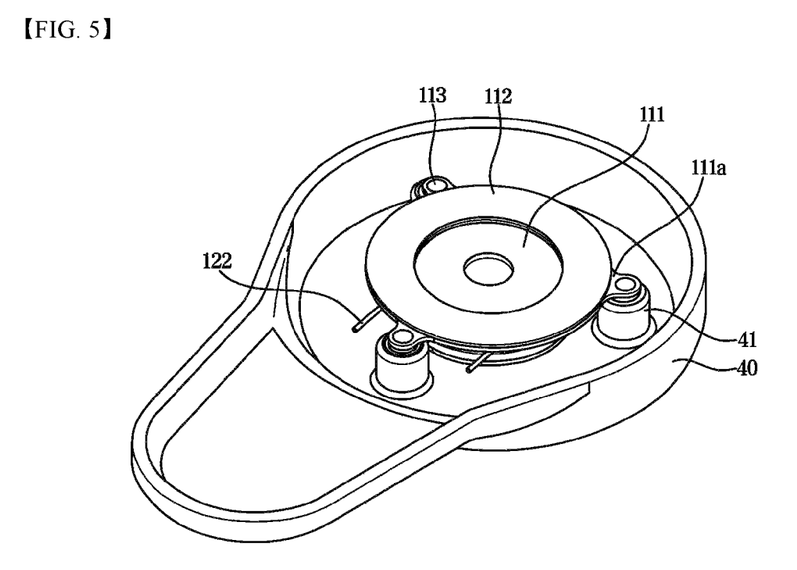
FIG. 5 is a perspective view illustrating a state in which a locking portion of an actuator for a parking brake is assembled to a housing cover according to an embodiment of the disclosure.

FIG. 1 is a cutaway perspective view illustrating a cross section of an actuator for a parking brake according to an embodiment of the disclosure, FIG. 2 is an exploded perspective view illustrating an actuator for a parking brake according to an embodiment of the disclosure, FIGS. 3 and 4 are a perspective views illustrating a state in which a reduction gear portion and a locking member of an actuator for a parking brake are assembled to a housing according to an embodiment of the disclosure, and FIG. 5 is a perspective view illustrating a state in which a locking portion of an actuator for a parking brake is assembled to a housing cover according to an embodiment of the disclosure.

Referring to FIGS. 1 to 5, an actuator 1 for a parking brake according to an embodiment of the disclosure may include a motor 10 that generates power, a reduction gear portion 20 for transmitting the power of the motor 10 to a parking portion (not shown) that implements a parking braking of the vehicle, a housing 30 in which the motor 10 and the reduction gear portion 20 are accommodated, a housing cover 40 for closing the housing 30, and a locking portion 100 for limiting rotation of the reduction gear portion 20.

The motor 10 generates the power by receiving an electrical signal. The motor 10 may be accommodated in an internal space of the housing 30 coupled to a vehicle body (not shown) or a caliper (not shown).

Furthermore, a rotation gear 12 is coupled to an end of a drive shaft 11 of the motor 10 to be interlocked with a driving gear 21 of the reduction gear portion 20 to be described later. For example, the rotation gear 12 of the motor 10 transmits power through a belt connecting the driving gear 21 or through at least one connecting gear (not shown) meshing with the driving gear 21.

The housing 30 may be provided to accommodate the motor 10, the reduction gear portion 20, and the locking portion 100, and the like. In particular, the housing 30 may accommodate and settle the motor 10 on one side thereof, accommodate the reduction gear portion 20 on the other side thereof, and be coupled to the housing cover 40 to close thereinside.

The housing cover 40 may be provided to close the inside of the housing 30.

Furthermore, the housing cover 40 is formed to protrude toward the locking portion 100 at a position corresponding to the pin 113 to be described later, and includes a plurality of bosses 41 for accommodating the pins 113 with a hole recessed in a center thereof. In addition, each of the bosses 41 may be provided with a stepped portion 41a formed inside to accommodate the pins 113 and also support an elastic member 130.

The reduction gear portion 20 may transmit the power of the motor 10 to the parking portion (not shown), and may adjust a gear ratio to decrease a speed while amplifying the torque.

The reduction gear portion 20 may include the driving gear 21 interlocked with the rotation gear 12, a sun gear 23 that is accommodated at a lower end of the driving gear 21 and is coupled to the same rotation shaft as the driving gear 21 to rotate together, a plurality of planetary gears 24 that are externally meshed with the sun gear 23, and an external gear 25 that are externally meshed with the plurality of planetary gears 24 to rotate and transmits power to the parking portion (not shown).

The rotation shaft of the reduction gear portion 20 may be provided parallel to the drive shaft 11 of the motor 10, and the driving gear 21 and the sun gear 23 may be coupled to the same rotation shaft to be rotatable together.

The driving gear 21 may be provided with a hollow at a side thereof to accommodate the sun gear 23, the planetary gears 24, and the external gear 25. As a result, the driving gear 21 may receive power from the motor 10 to transmit the power to the parking portion (not shown) through the sun gear 23, the planetary gears 24, and a connection portion 25*a* of the external gear 25 in sequence.

An upper surface of the driving gear 21 may be provided to be able to rub against a first friction member 112 of the locking portion 100 to be described later. More specifically, a surface of the driving gear 21 facing the locking portion 100 may be a friction coating to improve frictional force, thereby improving the frictional force of the locking portion 100. Alternatively, a second friction member 22 is installed on the surface of the driving gear 21 opposite to the locking portion 100 instead of the friction coating, so that the second friction member 22 may be frictionally provided with the first friction member 112. The second friction member 22 may be provided in a shape corresponding to the first friction member 112. In this case, the second friction member 22 may be made of the same material as the first friction member 112, and may be formed of a synthetic resin having a high friction coefficient.

The sun gear 23 may be connected to the same rotation shaft as the driving gear 21 to be rotatable together, and transmit power to the external gear 25 through at least one planetary gear 24 that is externally meshed with the sun gear 23. At this time, the planetary gears 24 may rotate in place.

The external gear 25 is externally meshed with the planetary gears 24 from one side thereof, and the connection portion 25*a*, that is connected to the parking portion (not shown), provided on the other side of the external gear 25 may transmit power from the planetary gears 24 to the parking portion (not shown). Furthermore, the external gear 25 may be supported by a support guide 26 from a lower end thereof.

The connection portion 25*a* may be provided in the form of a groove in which gear teeth are provided, and may be connected to the parking portion (not shown). For example, in a caliper brake system, the parking portion (not shown) may include a spindle-nut, a piston, and a pad plate, and the like, and the spindle is coupled to the connecting portion 25*a* to transmit power to press the pad plate against a disk. Because a specific operation of parking braking is a well-known technique, a detailed description thereof will be omitted. Furthermore, the actuator 1 for the parking brake of the disclosure is not limited to the caliper brake system, but is also applicable to the parking portion (not shown) of a drum brake system. Accordingly, it should be understood in the same manner that even if the connection portion 25*a* of the reduction gear portion 20 is connected to the parking portion (not shown) that implements parking braking of the drum brake system.

The locking portion 100 may be installed on the housing cover 40, and may be selectively provided to be in close contact with the reduction gear portion 20 to limit rotation of the reduction gear portion 20. In other words, to prevent the parking portion from being released in the parking braking state, the locking portion 100 may be provided to be in close contact with the reduction gear portion 20 to prevent the rotation of the reduction gear portion 20 by using frictional force.

The locking portion 100 may be provided to be movable in an axial direction of the reduction gear portion 20. The locking portion 100 may be interposed between the reduction gear portion 20 and an electromagnet member 120 to be in close contact with and spaced apart from the reduction gear portion 20 side by the electromagnetic force of the electromagnet member 120.

The locking portion 100 may include a locking member 110 that is in close contact with or spaced apart from the reduction gear 20, and the elastic member 130 that elastically supports the locking member 110 to bring the locking member 110 into close contact with the reduction gear 20 side, and the electromagnet member 120 that separates the locking member 110 from the reduction gear portion 20 by generating an electromagnetic force when power is applied.

The locking member 110 may include a plate 111 provided in a circular shape, the first friction member 112 that is provided on a surface of the plate 111 facing the reduction gear portion 20 to be in close contact with the reduction gear portion 20, and at least one pin 113 having one side thereof coupled to the plate 111 and the other side thereof constrained to the housing cover 40 to prevent rotation of the plate 111.

The plate 111 may be formed of a material movable by the electromagnetic force of the electromagnet member 120, and may be formed of, for example, a metal such as a steel material. Furthermore, the plate 111 may be provided in a circular shape, and at least one extension portion 111*a* may be formed on an edge thereof in a radial direction. The extension portion 111*a* may be disposed radially, and one end of the pin 113 may be coupled to the extension portion 111*a*.

One surface of the first friction member 112 is attached to the plate 111 and the other surface thereof is provided to be in close contact with the reduction gear portion 20. More specifically, as the plate 111 moves, the first friction member 112 may be in close contact with the driving gear 21 or the second friction member 22 to limit the rotation of the reduction gear portion 20.

One end of the pin 113 is fixed to the extension portion 111*a* of the plate 111, and the other end thereof is inserted into the boss 41 provided on the housing cover 40 to prevent the plate 111 from rotating in a circumferential direction. In other words, the pin 113 is constrained to the housing cover 40 to allow an axial movement of the plate 111, but restrict a rotational movement of the plate 111 in the circumferential direction.

Furthermore, at least one pin 113 may be provided, and each pin 113 may penetrate a center of the elastic member 130 to be inserted into the boss 41. At this time, the pin 113 and the elastic member 130 are inserted into the boss 41 together, and the elastic member 130 may be supported by the stepped portion 41*a* of the boss 41.

The elastic member 130 may elastically support the locking member 110 to bring the locking member 110 into close contact with the reduction gear portion 20 side. More specifically, the elastic member 130 may be provided as a coil spring that is interposed between the housing cover 40 and the locking member 110 and through which the pin 113 passes. As a result, one side of the elastic member 130 is supported by the housing cover 40 and the other side thereof is supported by the plate 111, so that the elastic member may elastically support the locking member 110 toward the reduction gear portion 20. Accordingly, the locking member 110 and the reduction gear portion 20 are in close contact with each other.

The electromagnet member 120 may be provided to generate an electromagnetic force when power is applied to separate the locking member 110 from the reduction gear portion 20.

The electromagnet member 120 may include a core 121 having one side fixed to the housing cover 40 and the other side thereof protruding toward the locking member 110, and a coil 122 that surrounds an outer circumferential surface of the core 121 and generates electromagnetic force.

The core 121 is provided in a cylindrical shape, and an end of the core on the housing cover 40 side is formed to be extend in a radial direction and thus is fixed so as not to be removed while being inserted into the housing cover 40. The coil 122 may be wound and fixed at least a plurality of times on an outer circumferential surface of the core 121.

The coil 122 may be connected to a power source to generate an electromagnetic force when an electrical signal is applied, and the attractive force by the electromagnetic force acts on the plate 111 of the locking member 110 to able to be separated the locking member 110 from the reduction gear portion 20. In other words, the magnitude of the electromagnetic force generated by the coil 122 when power is applied is greater than that of the elastic force of the elastic member 130, and the electromagnetic force may maintain a constant distance between the locking member 110 and the reduction gear portion 20 when the vehicle is driving.

Hereinafter, an operation of the actuator 1 for a parking brake according to an embodiment of the disclosure will be described.

Figure 6:
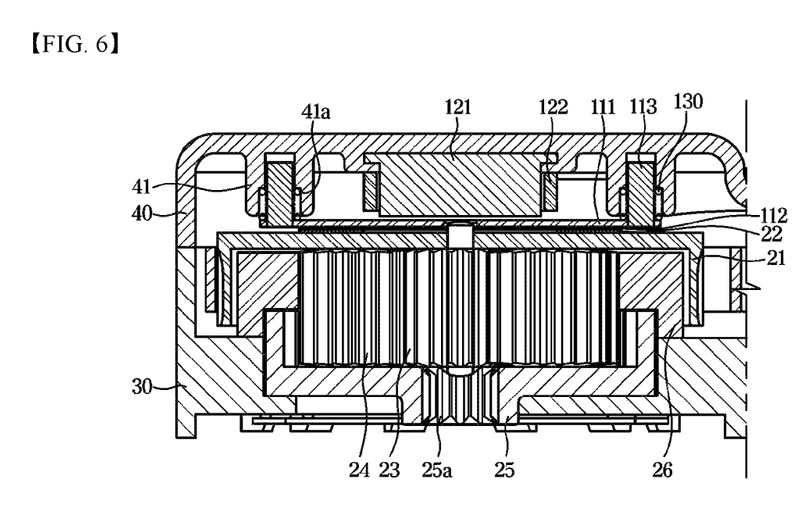
FIG. 6 is a cross-sectional view illustrating an operation of the actuator for a parking brake in a locking mode according to an embodiment of the disclosure.
Figure 7:
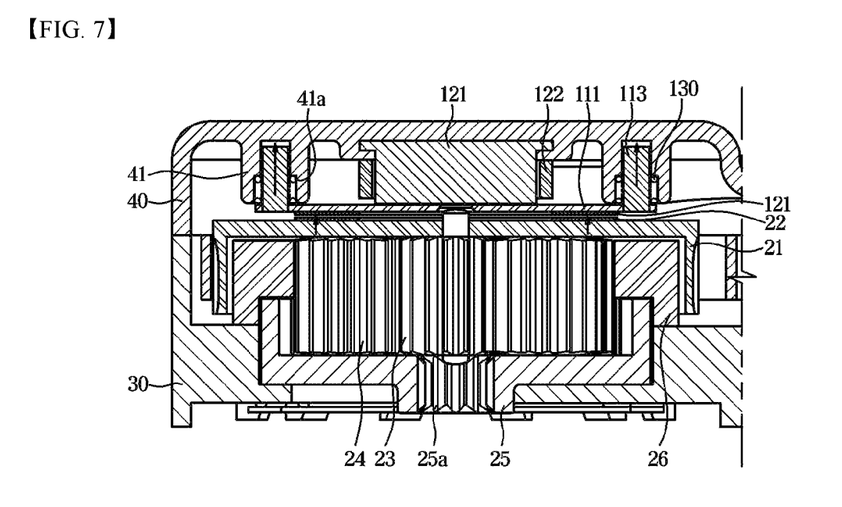
FIG. 7 is a cross-sectional view illustrating an operation of the actuator for parking brake when the locking mode is released according to an embodiment of the disclosure.

FIG. 6 is a cross-sectional view illustrating an operation of the actuator 1 for the parking brake in the locking mode according to an embodiment of the disclosure, and FIG. 7 is a cross-sectional view illustrating an operation of the actuator for parking brake when the locking mode is released according to an embodiment of the disclosure.

Referring to FIGS. 6 and 7, the actuator 1 for the parking brake according to an embodiment of the disclosure may operate in the locking mode for maintaining the parking braking state of the vehicle and in a locking release mode due to the release of the parking braking of the vehicle.

First, in the locking mode, the actuator 1 for the parking brake receives an electric signal from an electronic control unit (ECU, not shown), generates power to the motor 10, and transmits the power to the parking portion (not shown) through the reduction gear portion 20, thereby implementing the parking braking. When the parking braking is completed, the locking portion 100 prevents the reduction gear portion 20 from rotating in the direction in which the braking is released in order to maintain the braking state. More specifically, when the braking is completed, the power applied to the electromagnet member 120 is released, and the electromagnetic force acting on the locking member 110 extinguished. At this time, the locking member 110 is elastically supported toward the reduction gear portion 20 by the elastic member 130 and thus is in close contact with the reduction gear portion 20 to prevent the reduction gear portion 20 from rotating. In particular, when the locking member 110 and the reduction gear portion 20 are in close contact with each other, the first friction member 112 provided on the plate 111 is in close contact with the second friction member 22 (or friction coating portion of the driving gear) provided on the drive gear 21, so that the rotation of the reduction gear portion 20 may be prevented by the frictional force.

Next, when the locking mode is released, the actuator 1 for the parking brake separates the locking portion 100 from the reduction gear portion 20 to release the parking braking, thereby allowing the reduction gear portion 20 to rotate in the braking release direction. More specifically, the ECU applies power to the electromagnet member 120 to generate electromagnetic force, and thus the locking member 110 is spaced apart from the reduction gear portion 20 by the electromagnetic force. At this time, the electromagnetic force is greater than the elastic force of the elastic member 130 elastically supporting the locking member 110 toward the reduction gear portion 20, so that the locking member 110 is spaced apart from the reduction gear portion 20. In particular, the electromagnetic force generated by the coil 122 acts on the plate 111 and then the plate 111 moves toward the housing cover 40. As a result, a gap is generated between the first friction member 112 and the second friction member 22, so that the frictional force is not generated, thereby allowing the rotation of the reduction gear portion 20.

When the locking portion 100 is spaced apart, the motor 10 receiving an electrical signal from the ECU (not shown) generates power in a direction to release the parking braking and transmits the power through the reduction gear portion 20, thereby implementing the braking release.

As described above, the actuator 1 for the parking brake according to an embodiment of the disclosure may prevent the braking from being released in the parking braking state. Furthermore, because the power is not applied to the locking portion 100 in the locking mode, it is possible to quickly and stably maintain the posture of the vehicle without additional current consumption in the parking state of the vehicle.

In addition, because the locking portion 100 is installed on the housing cover 40, it is possible to change only the housing cover 40 by detaching the housing cover 40 when replacing parts or changing the design, so that assembly and design freedom are improved.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a parking brake, comprising:
 a motor generating power;
 a reduction gear portion configured to transmit the power of the motor to a parking portion implementing a parking braking of a vehicle;
 a housing in which the motor and the reduction gear portion are accommodated;
 a housing cover for closing the housing; and
 a locking portion configured to limit rotation of the reduction gear portion;
 wherein the locking portion comprises:
 a locking member that is provided to be movable in an axial direction of the reduction gear portion and is close contact with or spaced apart from the reduction gear portion,
 an elastic member elastically supporting the locking member toward the reduction gear portion, an electromagnet member configured to separate the locking member from the reduction gear portion by generating an electromagnetic force when the power is applied, wherein the locking member comprises:

a plate, and a first friction member that is provided on a surface of the plate facing the reduction gear portion and provided to bring into close contact with the reduction gear portion.

2. The actuator of claim 1, wherein the locking member comprises:

at least one pin having one side thereof coupled to the plate and the other side thereof inserted into the housing cover to prevent rotation of the plate.

3. The actuator of claim 2, wherein the plate is disposed coaxially with the reduction gear portion and provided in a circular shape.

4. The actuator of claim 3, wherein the at least one pin is coupled to at least one extension portion extending radially from an edge of the plate.

5. The actuator of claim 2, wherein the at least one pin is disposed radially with respect to a central axis of the plate.

6. The actuator of claim 2, wherein the housing comprises:

at least one boss protruding at a position corresponding to the at least one pin and having a hole recessed therein for accommodating the at least one pin.

7. The actuator claim 1, wherein the elastic member is provided as at least one coil spring interposed between the housing cover and the plate.

8. The actuator of claim 1, wherein the reduction gear portion further comprises a second friction member provided on a surface facing the first friction member.

9. The actuator of claim 8, wherein the plate, the first friction member, the second friction member, and the reduction gear portion are provided side by side.

10. The actuator of claim 1, wherein a surface facing the first friction member is friction coated in the reduction gear portion.

11. An actuator for a parking brake, comprising:

a motor generating power;

a reduction gear portion configured to transmit the power of the motor to a parking portion implementing a parking braking of a vehicle;

a housing in which the motor and the reduction gear portion are accommodated;

a housing cover for closing the housing; and a locking portion configured to limit rotation of the reduction gear portion;

wherein the locking portion comprises:

a locking member that is provided to be movable in an axial direction of the reduction gear portion and is close contact with or spaced apart from the reduction gear portion, an elastic member elastically supporting the locking member toward the reduction gear portion, an electromagnet member configured to separate the locking member from the reduction gear portion by generating an electromagnetic force when the power is applied, wherein the electromagnet member comprises:

a core having one side thereof coupled to the housing cover and the other side thereof protruding toward the locking member, and a coil wound on an outer circumferential surface of the core to generate electromagnetic force.

12. An actuator for a parking brake, comprising:

a motor generating power;

a reduction gear portion configured to transmit the power of the motor to a parking portion implementing a parking braking of a vehicle;

a housing in which the motor and the reduction gear portion are accommodated;

a housing cover for closing the housing; and a locking portion configured to limit rotation of the reduction gear portion;

wherein the locking portion comprises:

a locking member that is provided to be movable in an axial direction of the reduction gear portion and is close contact with or spaced apart from the reduction gear portion, an elastic member elastically supporting the locking member toward the reduction gear portion, an electromagnet member configured to separate the locking member from the reduction gear portion by generating an electromagnetic force when the power is applied, wherein the reduction gear portion comprises:

a driving gear interlocked with a drive shaft of the motor, a sun gear coupled to the driving gear to rotate together, a plurality of planetary gears meshed with the sun gear, and an external gear meshed with the plurality of planetary gears and having a connection portion connected to the parking portion.

* * * * *